(12) United States Patent
Charboneau et al.

(10) Patent No.: US 10,632,876 B2
(45) Date of Patent: Apr. 28, 2020

(54) SUSPENSION PEDESTAL

(71) Applicant: CDG Coast Dynamics Group Ltd., Victoria (CA)

(72) Inventors: Daniel Bennett Charboneau, Victoria (CA); Daryl Peter Peereboom, Brentwood Bay (CA); Mark Leighton Foster, Victoria (CA); Paul Wesley Taylor, Victoria (CA)

(73) Assignee: CDG Coast Dynamics Group Ltd., Victoria (CA)

( * ) Notice: Subject to any disclaimer, the term of this patent is extended or adjusted under 35 U.S.C. 154(b) by 0 days.

(21) Appl. No.: 16/134,535

(22) Filed: Sep. 18, 2018

(65) Prior Publication Data
US 2019/0084454 A1 Mar. 21, 2019

Related U.S. Application Data

(60) Provisional application No. 62/560,121, filed on Sep. 18, 2017.

(51) Int. Cl.
| *F16M 11/00* | (2006.01) |
| *B60N 2/52* | (2006.01) |
| *B63B 29/04* | (2006.01) |
| *B60N 2/50* | (2006.01) |

(52) U.S. Cl.
CPC ............. *B60N 2/525* (2013.01); *B60N 2/522* (2013.01); *B63B 29/04* (2013.01); *B60N 2/502* (2013.01); *B63B 2029/043* (2013.01)

(58) Field of Classification Search
CPC ......... B60N 2/528; F16M 11/28; F16B 12/02; A47C 3/30
See application file for complete search history.

(56) References Cited

U.S. PATENT DOCUMENTS

| 5,197,700 | A | * | 3/1993 | Chapman | F16M 11/28 248/125.1 |
| 8,128,053 | B2 | * | 3/2012 | Etzkorn | A47C 3/30 248/404 |
| 2008/0121150 | A1 | * | 5/2008 | Picchio | A47B 9/04 108/147.19 |
| 2017/0370391 | A1 | * | 12/2017 | Goelst | F16B 12/02 |

* cited by examiner

*Primary Examiner* — Amy J. Sterling
(74) *Attorney, Agent, or Firm* — Roni M. Jones, Oyen Wiggs Green & Mutala LLP

(57) ABSTRACT

A suspension pedestal may be employed with a vehicle seat (e.g. a boat seat). The suspension pedestal comprises a piston partially received within a base, and an isolator to mitigate relative movement between the base and piston. A flange extends circumferentially around the base, and is releasably fixable to the base at any point between the ends of the base.

19 Claims, 16 Drawing Sheets

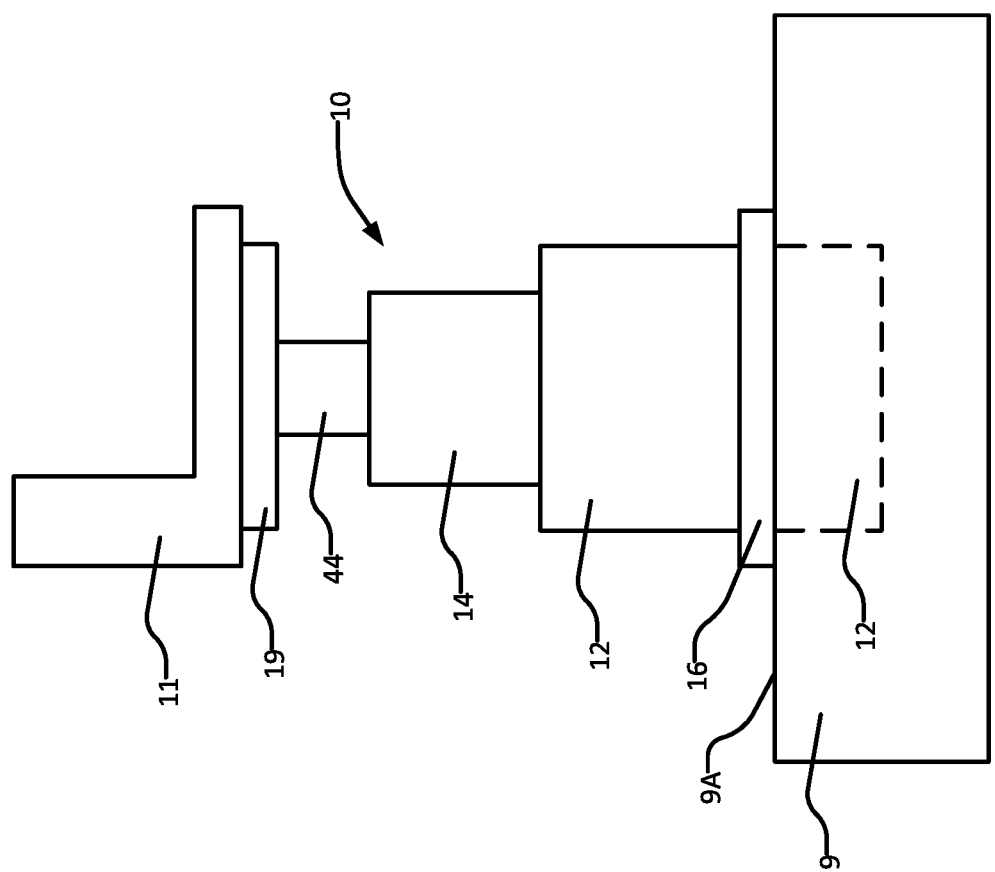

SUSPENSION PEDESTAL

REFERENCE TO RELATED APPLICATIONS

This application claims from the benefit of U.S. application No. 62/560,121 filed 18 Sep. 2017 which is hereby incorporated herein by reference.

FIELD

This invention relates generally to suspension systems, and in particular to suspension pedestals for commercial and recreational vehicle seats.

BACKGROUND

Suspension seats for commercial and recreational vehicles can reduce the forces experienced by operators or passengers as the vehicles move while travelling over rough surfaces. An example application of suspension seats is in fast boats travelling in rough water. A typical suspension seat comprises a first portion and a second portion movable relative to the first portion. An isolator, such as a coil-over shock absorber or an air-shock absorber, mitigates relative movement between the first and second portions. The first portion is attached to a vehicle surface, and the second portion is attached to a seat. Forces applied to the first portion as the vehicle bounces (e.g. as a boat moves through water) are mitigated by the isolator, such that the magnitude of these forces transferred to a person supported by the second portion is limited.

The mechanism which allows relative motion of the first and second portions of a suspension seat may include one or more bushings to reduce the coefficient of friction between the two portions as they move relative to each other. Such bushings are known in the art, and have several disadvantages. For example, a bushing can quickly become worn through its contact with the first and second portions. Bushing wear can be amplified by the side-loading that a seat may experience on some vehicles, such as boats which encounter waves from various directions. Such wear of the bushings may allow the second portion to move radially or angularly relative to the first portion. This element of "play" is undesirable, as it may affect the integrity of the first and second portions. There remains a need for a long-lasting means of limiting friction and radial or angular movement between the portions of a suspension seat.

Some suspension seats may be rotatable, while some may be fixed into a particular rotational position about a longitudinal axis. Suspension seats which are fixed generally comprise a block stop on the second portion, which sits in a corresponding slot in the first portion. Over time, as the block stop rubs against the edges of the slot in order to prevent the second portion from rotating, the block stop may become worn, such that more and more relative rotational motion is allowed between the first and second portions. There remains a need for long-lasting means of preventing rotation in suspension seats.

In addition, suspension seats are generally provided in models which have a fixed range of heights. The first portion of the suspension seat is at a permanently fixed height once it is installed, thereby limiting the height range of the suspension seat. Typically, if it is desired to have a suspension seat at a certain height from the vehicle surface, a specific model of suspension seat having a height range which includes that specific height must be employed. If a model of suspension seat that can be adjusted to provide the desired height is not offered or available then the vehicle owner may be forced to make alterations to the first portion of the suspension seat or to the vehicle to achieve the desired height. There remains a need for a suspension seat with a wider range of available heights.

SUMMARY

This invention has a number of aspects. These aspects may be applied individually or in any combinations. Some aspects provide seat suspension assemblies or systems, some aspects provide methods for installing seat suspension systems.

One aspect of the invention provides a suspension system comprising a hollow base having longitudinally-opposed distal and proximal base ends, the distal base end being open; a piston having longitudinally-opposed distal and proximal piston ends, the proximal piston end being at least partially received within the base and movable relative to the base in a longitudinal direction; a suspension damper having a distal damper end and a proximal damper end, the distal damper end fixed to the piston and the proximal damper end fixed to the base to damp relative longitudinal movement between the base and the piston; and a flange extending in a circumferential direction around an exterior surface of the base and extending in an outward radial direction from the base, the flange releasably fixable to the exterior surface of the base.

Another aspect of the invention provides a plurality of base rollers fixed to an interior surface of the base to roll against an exterior surface of the piston as the piston moves in the longitudinal direction relative to the base. Each of the base rollers may be circumferentially-spaced apart from adjacent base rollers along the interior surface of the base. One or more of the plurality of base rollers may be biased in an inward radial direction toward the exterior surface of the piston. Each of the plurality of base rollers may comprise a base roller wheel rotatable around a base roller axle, each base roller axle tangential to the interior surface of the base. A spacing between at least one of the base roller axles and the interior surface of the base may be fixed. Each of the plurality of base rollers may be composed from material selected from a group consisting of: polyoxymethylene, polyether ether ketone, stainless steel, carbon-fibre-reinforced polymer, glass-reinforced polymer, and naval brass.

Another aspect of the invention provides a plurality of piston rollers fixed to an exterior surface of the piston to roll against an interior surface of the base as the piston moves in the longitudinal direction relative to the base. Each of the plurality of piston rollers may be circumferentially-spaced apart from adjacent piston rollers along the exterior surface of the piston. One or more of the plurality of piston rollers may be biased in the outward radial direction toward the interior surface of the base. Each of the plurality of piston rollers may comprise a piston roller wheel rotatable around a piston roller axle, each piston roller axle tangential to the exterior surface of the piston. Each of the plurality of piston rollers may be composed from material selected from a group consisting of: polyoxymethylene, polyether ether ketone, stainless steel, carbon-fibre-reinforced polymer, glass-reinforced polymer, and naval brass.

Another aspect of the invention provides a wedge member on the flange, the wedge member abuttable against the exterior surface of the base to releasably fix the flange to the base. The wedge member may be fixed to the flange by one or more fasteners, each of the one or more fasteners comprising a beveled surface that abuts a beveled surface the wedge member to increasingly force the wedge member in the inward radial direction against the exterior surface of the base as each of the one or more fasteners is tightened. The wedge member may be fixed to the flange by one or more fasteners, each of the one or more fasteners abutting a beveled intermediate piece that abuts a beveled surface the wedge member to increasingly force the wedge member in the inward radial direction against the exterior surface of the base as each of the one or more fasteners is tightened. A surface of the wedge member that abuts the exterior surface of the base may be complementary in shape or surface curvature to the exterior surface of the base.

Another aspect of the invention provides first and second guide walls on the base, the first and second guide walls extending in the longitudinal direction, and a wheel on the piston, the wheel free to move in the longitudinal direction and limited in movement in a circumferential direction by the first and second guide walls to thereby limit rotation of the piston relative to the base.

Another aspect of the invention provides first and second guide walls on the piston, the first and second guide walls extending in the longitudinal direction, and a wheel on the base, the wheel free to move in the longitudinal direction and limited in movement in a circumferential direction by the first and second guide walls to thereby limit rotation of the piston relative to the base.

Another aspect of the invention provides a height-adjust shaft having longitudinally-opposed distal and proximal height-adjust shaft ends, the height-adjust shaft being at least partially received within the piston. The height-adjust shaft may be selectively movable in the longitudinal direction relative to the piston such that the proximal height-adjust shaft end is fixable at any position between the distal and proximal ends of the piston. The height-adjust shaft may be selectively movable in the longitudinal direction relative to the piston such that such that an entirety of the height-adjust shaft may be contained within the piston. The piston may comprise third and fourth guide walls extending in the longitudinal direction and the height-adjust shaft may comprise a height-adjust wheel, the height-adjust wheel free to move in the longitudinal direction and limited in movement in a circumferential direction by the third and fourth guide walls to thereby limit rotation of the height-adjust shaft relative to the piston. The height-adjust shaft may comprise third and fourth guide walls extending in the longitudinal direction and the piston may comprise a piston wheel, the piston wheel free to move in the longitudinal direction and limited in movement in a circumferential direction by the third and fourth guide walls to thereby limit rotation of the height-adjust shaft relative to the piston. A seat may be fixed to the distal height-adjust shaft end.

Another aspect of the invention provides a seat fixed to a distal piston end.

Another aspect of the invention provides that the flange is fixed to a vehicle deck. The base may extend through the vehicle deck.

Another aspect of the invention provides a suspension system comprising a hollow base; a piston telescopically received in the base for longitudinal motion relative to the base, the piston being biased to extend from the base; a damper connected between the piston and the base to damp relative longitudinal movement between the base and the piston; and a mounting flange movable longitudinally along the base and selectively fixable to the base at any of plural locations spaced longitudinally along the base. The suspension system may comprise any of the features described above or any combination of any of the features described above.

Another aspect of the invention provides a seat pedestal comprising a base; a support for receiving a seat, the support mounted to the base; and a flange extending in a circumferential direction around an exterior surface of the base and extending in an outward radial direction from the base, the flange releasably fixable to the exterior surface of the base. The flange may comprise a wedge member abuttable against the exterior surface of the base to releasably fix the flange to the base. Each of the wedge member may be fixed to the flange by one or more fasteners, each of the one or more fasteners comprising a beveled surface that abuts a beveled surface of each of the wedge to increasingly force the wedge in the inward radial direction against the exterior surface of the base as each of the one or more fasteners is tightened. Each of the wedge member may be fixed to the flange by one or more fasteners, each of the one or more fasteners abutting a beveled intermediate piece that abuts a beveled surface of each of the wedge to increasingly force the wedge in the inward radial direction against the exterior surface of the base as each of the one or more fasteners is tightened.

Further aspects of the invention and features of specific embodiments of the invention are described herein.

BRIEF DESCRIPTION OF THE DRAWINGS

The accompanying drawings illustrate non-limiting example embodiments of the invention.

FIG. 1B is a schematic view of the suspension pedestal shown in FIG. 1A fixed to a vehicle surface and supporting a seat.

DETAILED DESCRIPTION

Throughout the following description, specific details are set forth in order to provide a more thorough understanding of the invention. However, the invention may be practiced without these particulars. In other instances, well-known elements have not been shown or described in detail to avoid unnecessary obscuring of the invention. Accordingly, the specification and drawings are to be regarded in an illustrative, rather than a restrictive, sense.

One aspect of the invention provides a suspension pedestal for a seat. The suspension pedestal may be employed, for example, on a recreational or commercial vehicle, such as a boat, car, truck, dune buggy, tractor, bulldozer, excavator, other industrial machinery or construction equipment, or the like.

Figure 1A:
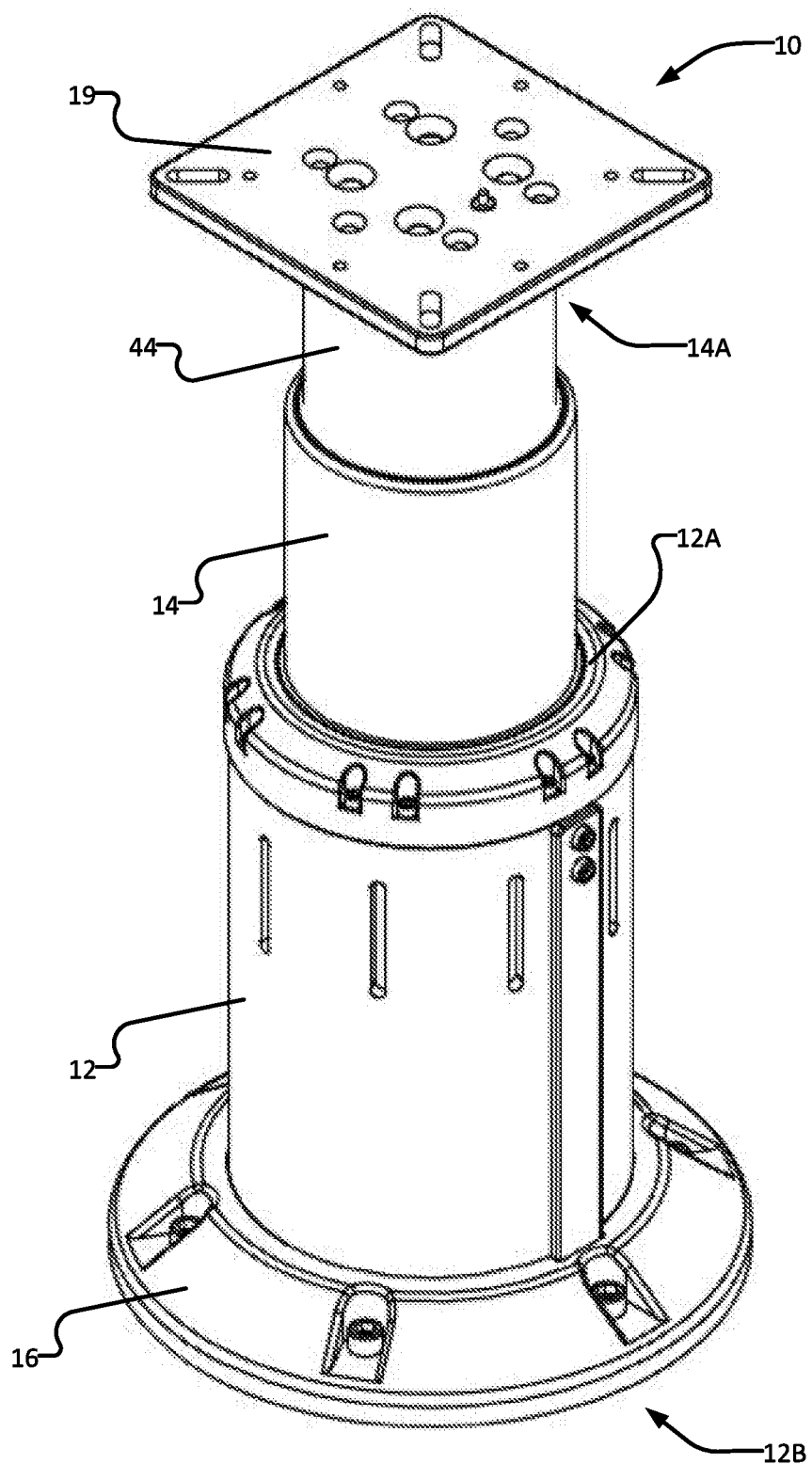
FIG. 1A is an exterior perspective view of a suspension pedestal, according to one example embodiment of the invention.

FIG. 1A is an exterior perspective view of a suspension pedestal 10, according to one embodiment of the invention. FIG. 1B is a schematic view of suspension pedestal 10 fixed to a vehicle 9 and supporting a seat 11. Components or portions of components of suspension pedestal 10 which are located relatively far from vehicle surface 9A may be referred herein to as "distal" components, while components which are located relatively close to vehicle surface 9A may be referred to as "proximal" components (for example, base 12 has a distal end 12A that is relatively farther apart from vehicle surface 9A then a proximal end 12B of base 12).

Figure 2:
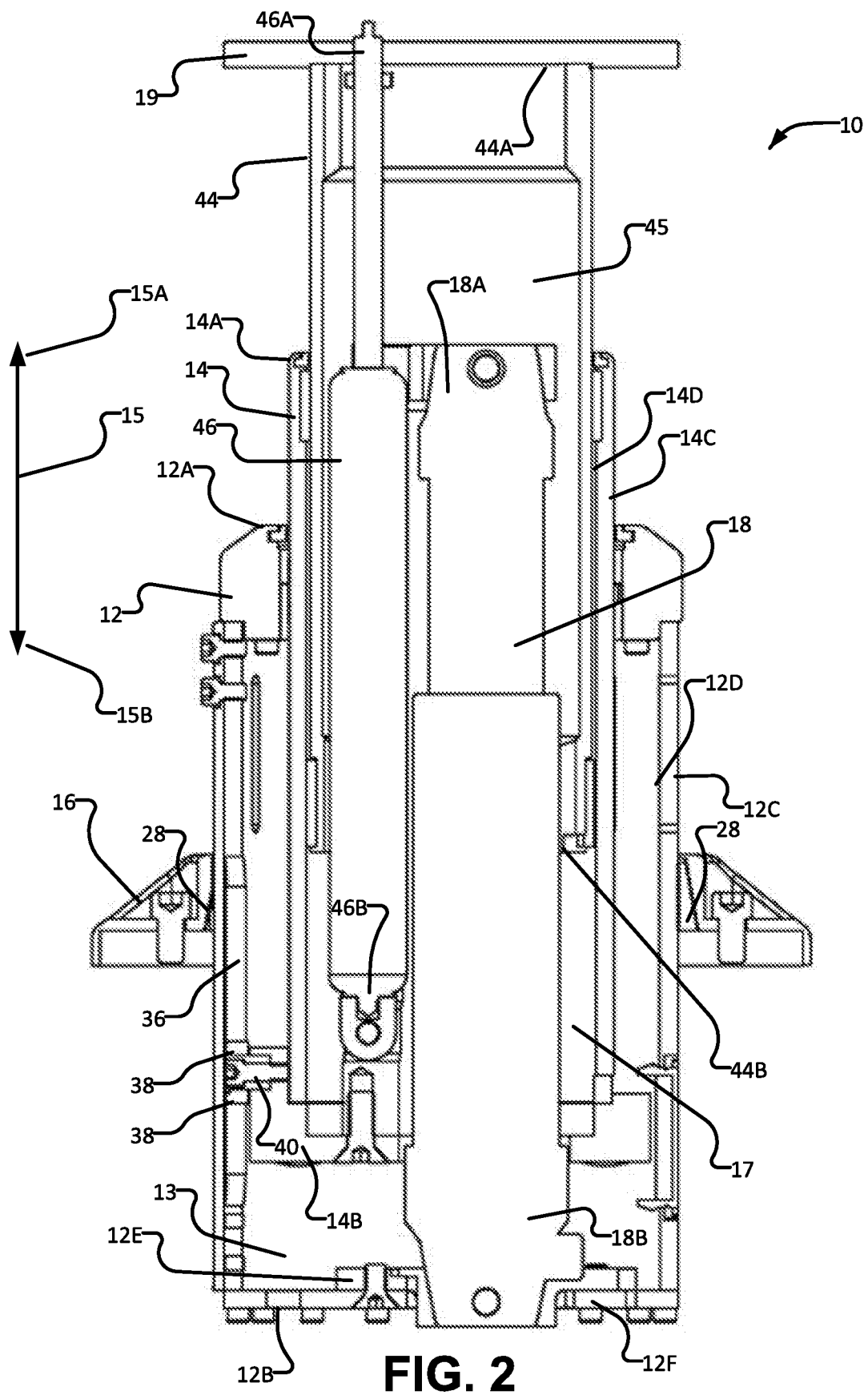
FIG. 2 is a cross-sectional view of the interior of the suspension pedestal shown in FIGS. 1A and 1B.
Figure 3:
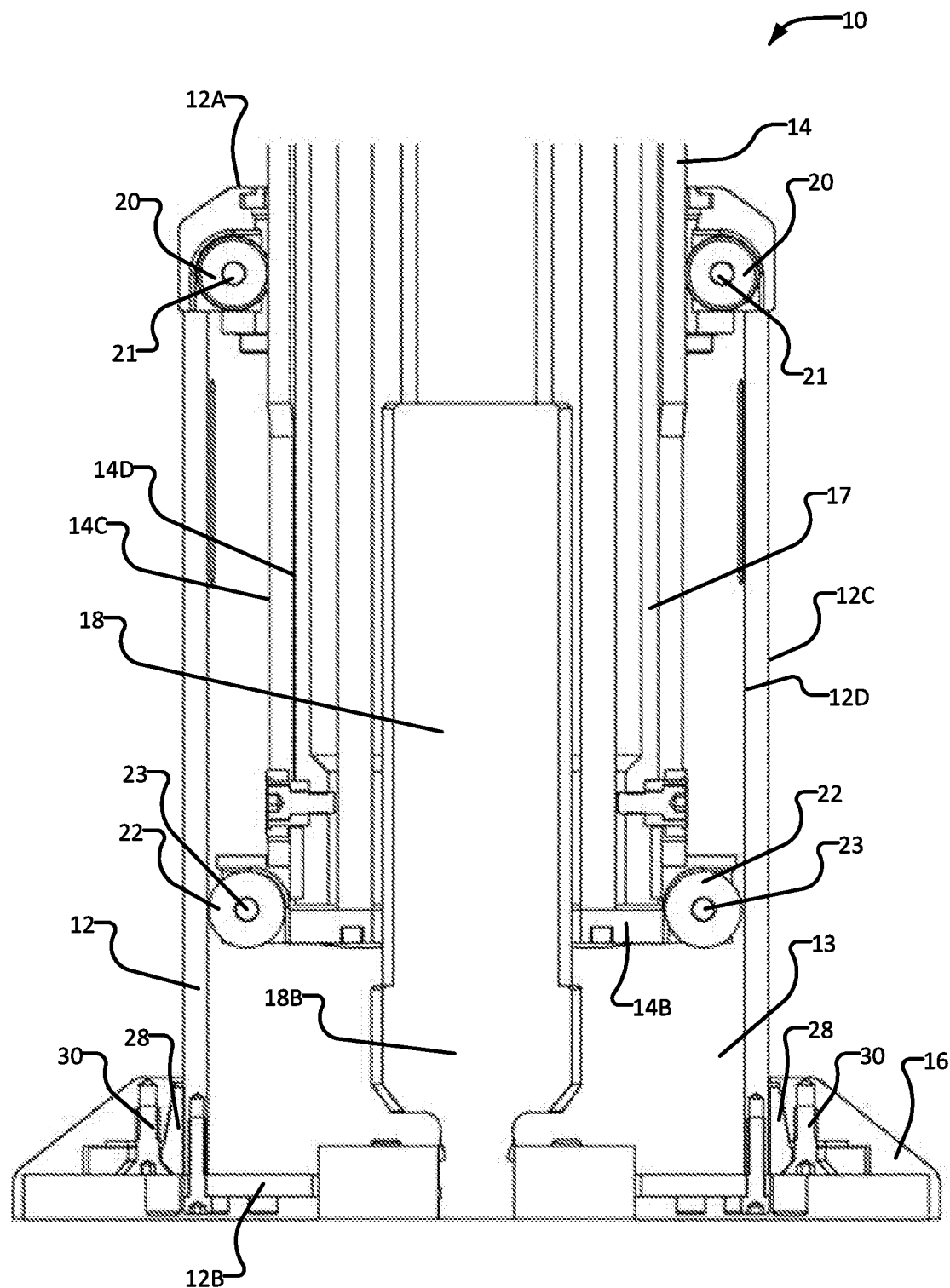
FIG. 3 is a cross-sectional view of a portion of the interior of the suspension pedestal shown in FIGS. 1A and 1B with some components not shown for simplicity.

FIGS. 2 and 3 are cross-sectional views of portions of the interior of suspension pedestal 10. Some elements shown in FIG. 2 have been removed from FIG. 3, and vice versa, in order to simply both figures.

Suspension pedestal 10 comprises first and second portions that are movable relative to one another. In the illustrated embodiment, the second portion is received telescopically in the first portion. In the illustrated embodiment the first portion comprises a base 12, having a distal end 12A and a proximal end 12B. The second portion is comprises a piston 14.

Base 12 may optionally have a cylindrical shape. Base 12 may be substantially hollow, such that a cavity 13 is formed within base 12. Distal end 12A comprises an opening. Proximal end 12B may also be open. Optionally, a cover or end cap (not shown) may be provided to cover the opening of proximal end 12B. Base 12 comprises an exterior surface 12C, and an interior surface 12D. Interior surface 12D defines cavity 13. Base 12 extends in a longitudinal direction 15 between distal end 12A and proximal end 12B. Base 12 may be composed of any suitable material or materials such as metal, polymer, composite, or a combination thereof. Exterior surface 12C and/or interior surface 12D of base 12 may be coated with a long-wearing material.

Pedestal 10 comprises a piston 14 which is at least partially receivable within cavity 13 of base 12. Piston 14 may protrude through the opening in distal end 12A of base 12. Piston 14 comprises distal end 14A and proximal end 14B. One or both of distal end 14A and proximal end 14B may comprise openings. Piston 14 may have a cylindrical shape. Piston 14 may be substantially hollow, such that a cavity 17 is defined within piston 14. Piston 14 comprises an exterior surface 14C, and an interior surface 14D. Interior surface 14D defines cavity 17. Piston 14 extends in longitudinal direction 15, and may be arranged to be co-axial with base 12, although this is not mandatory. In some embodiments, the longitudinal axis of piston 14 is offset from the longitudinal axis of base 12 to reduce unwanted movement between base 12 and piston 14. Piston 14 may be movable in longitudinal direction 15 relative to base 12. Piston 14 may be composed of any suitable material or materials such as metal, polymer, composite, or a combination thereof. Exterior surface 14C and/or interior surface 14D of piston 14 may be coated with a long-wearing material.

Piston 14 is biased in positive longitudinal direction 15A relative to base 12. Such bias may be provided for example by a spring, pneumatic chamber or the like or a combination of these. Suspension pedestal 10 comprises isolator 18. In some embodiments, a spring for biasing piston 14 is integrated with isolator 18 (e.g. isolator 18 may be in the form of a coil-over shock absorber or an air-shock absorber). Isolator 18 may limit the rate of compression (i.e. relative motion of proximal end 14B of piston 14 moving closer to proximal end 12B of base 12) and/or may limit the rate of rebound (i.e. relative motion of proximal end 14B of piston 14 moving closer to distal end 12A of base 12) such that an occupant of seat 11 provided on suspension pedestal 10 experiences a smoother ride on vehicle 9.

Figure 4:
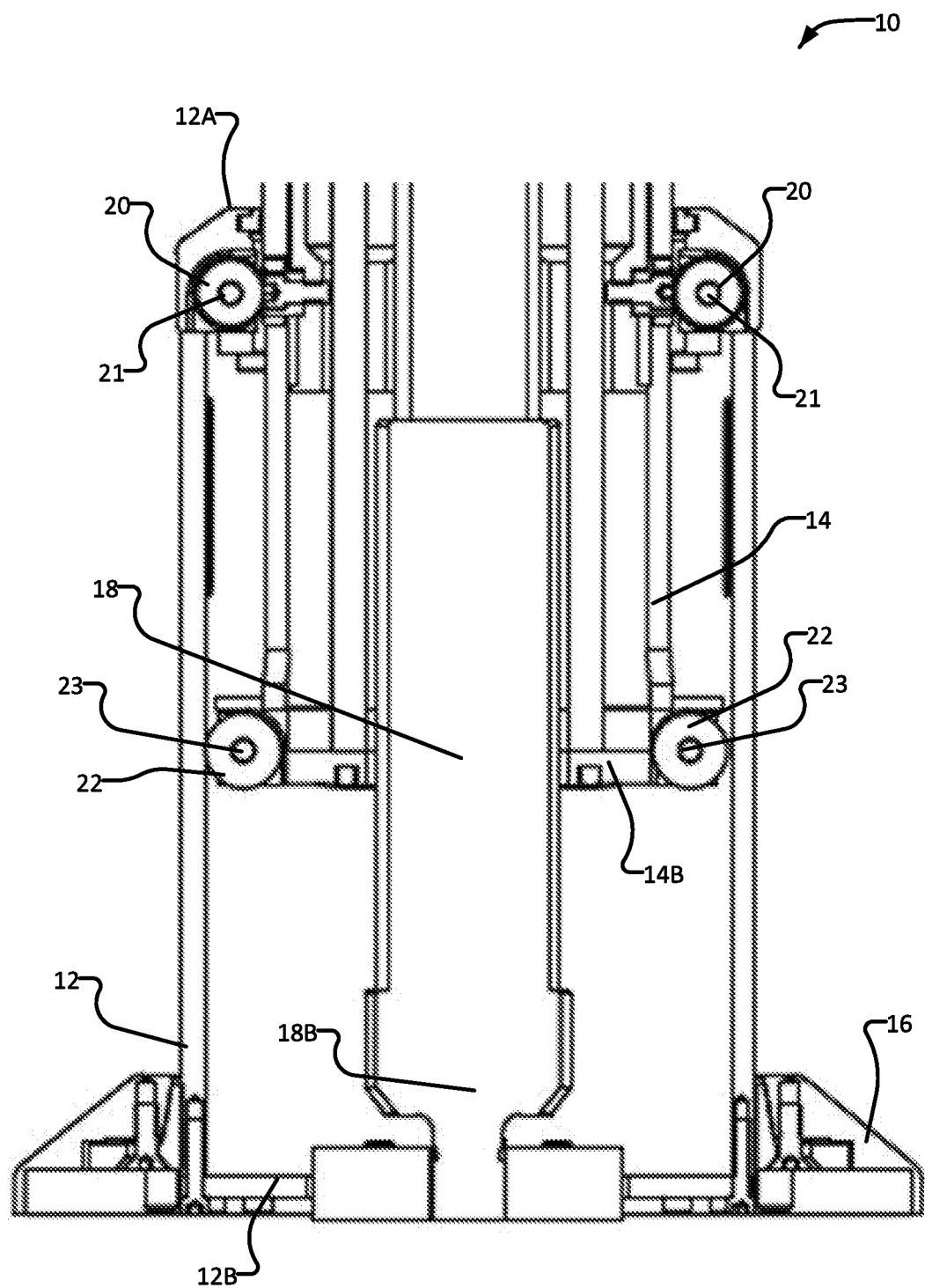
FIG. 4 is a cross-sectional view of a portion of the interior of the suspension pedestal shown in FIGS. 1A and 1B with an isolator in an extended state.

When a force is applied to base 12 which biases base 12 in positive longitudinal direction 15A, isolator 18 may compress to limit the portion of this force which is transferred to piston 14. When a force is applied to base 12 which biases base 12 in negative longitudinal direction 15B, isolator 18 may extend to limit the portion of this force which is transferred to piston 14. In other words, isolator 18 may reduce the amplitude of any oscillatory motion between base 12 and piston 14 as isolator 18 moves between a compressed state and an extended state. FIGS. 2 and 3 show isolator 18 in a partially compressed state, while FIG. 4 shows isolator 18 in an extended state.

Isolator 18 comprises distal end 18A and proximal end 18B. Distal end 18A is fixed to piston 14, and proximal end 18B is fixed to base 12. Proximal end 18B may be fixed to a bracket 12E and/or an end cap 12F attached to base 12. Distal end 18A may be fixed to a bracket 14E, where bracket 14E is attached to piston 14 at either the distal or proximal end 14A, 14B. Isolator 18 extends in longitudinal direction 15 through cavity 13, through proximal end 14B, and into cavity 17. Isolator 18 may be co-axial with base 12 or piston 14, or may be offset (e.g. to accommodate pneumatic cylinder 46 discussed below). Isolator 18 may comprise any suitable isolator, such as an elastomer, a mechanical isolator, a pneumatic isolator, or a hydraulic isolator. In some embodiments, isolator 18 comprises a FOX™ shock absorber.

Suspension pedestal 10 comprises a flange 16. Flange 16 may be fixed to vehicle surface 9A, such as a boat deck or the floor of a tractor, such that when flange 16 is fixed to exterior surface 12C of base 12, base 12 remains fixed in longitudinal direction 15 relative to vehicle surface 9A. The longitudinal location at which flange 16 is attached to base 12 is adjustable. Changing the longitudinal position at which flange 16 is fixed to base 12 thus has the effect of changing the height of base 12 relative to vehicle surface 9A. Vehicle surface 9A may be configured to receive any portion of base 12 which extends below (i.e. in negative longitudinal direction 15B) flange 16, as shown by the dashed line in FIG. 1B.

Flange 16 may extend in a circumferential direction 56 (shown in FIG. 15) around a portion, all or substantially all of the circumference of base 12. Flange 16 may extend in an outward radial direction 58B (shown in FIG. 15) away from base 12. Flange 16 may be releasably fixable to exterior surface 12C of base 12 at any longitudinal position along base 12 between distal end 12A and proximal end 12B. FIG. 2 shows flange 16 fixed to base 12 at a point partway between distal end 12A and proximal end 12B, while FIG. 3 shows flange 16 fixed to base 12 near proximal end 12B.

Various mechanisms may be provided to releasably affix flange 16 at a selected position along base 12. In the illustrated embodiment, flange 16 comprises a ring 16A and one or more wedge members 28 that clamp against exterior surface 12C of base 12.

Figure 6:
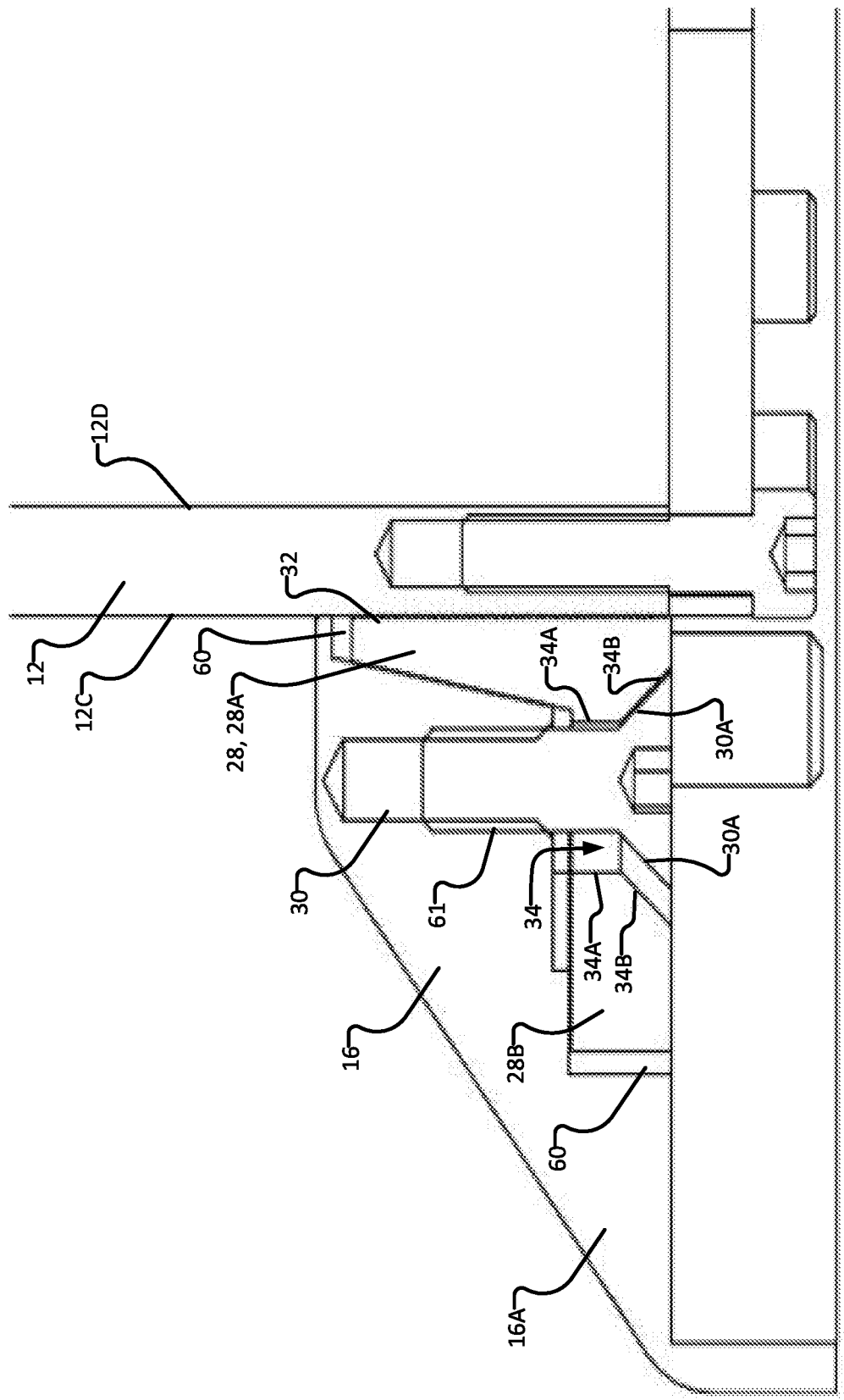
FIG. 6 is a detail cross-sectional view of a wedge member and fastener on the suspension pedestal shown in FIGS. 1A and 1B.

Each wedge member 28 may be fixed to ring 16A with one or more fasteners 30. When wedge members 28 are fixed to ring 16A, they may frictionally engage exterior surface 12C of base 12, to releasably fix flange 16 to base 12. FIG. 6 is a detail cross-sectional view of the relationship between flange 16, a wedge member 28, fastener 30, and base 12.

Wedge member 28 comprises a longitudinal portion 28A engaging exterior surface 12C and a radial portion 28B. Longitudinal portion 28A may comprise a plurality of teeth 32 for engaging exterior surface 12C. This is not mandatory. Wedge member 28 sits within a channel 60 in flange 16. An aperture 34 for receiving fastener 30 is defined by wedge member 28. Aperture 34 may comprise longitudinal surfaces 34A and beveled surfaces 34B.

Fastener 30 may extend through wedge member 28 and into a channel 61 in flange 16. Channel 61 may be threaded to receive complementary threads of fastener 30. In an example embodiment, each wedge member 28 is fixed to flange 16 with three fasteners 30. Fastener 30 may comprise beveled surfaces 30A, which may substantially correspond to beveled surfaces 34B. In some embodiments, fastener 30 does not have a beveled surface and a beveled intermediate piece (not shown) may instead be provided between a non-beveled surface of fastener 30 and beveled surface 34B. Fastener 30 may comprise a screw, bolt, or any other suitable fastening means.

Aperture 34 may be slightly wider than fastener 30 to allow wedge member 28 to move relative to fastener 30. As fastener 30 is tightened into place (for example, as fastener 30 is screwed through aperture 34 and into channel 61), the engagement between beveled surfaces 30A and 34B may force wedge member 28 in inward radial direction 58A towards exterior surface 12C of base 12 to thereby frictionally engage exterior surface 12C to lock flange 16 in place relative to base 12. As fastener 30 is untightened or removed from flange 16, wedge member 28 may be free to move away from base 12 in outward radial direction 58B through channel 60.

As fastener 30 is tightened and wedge member 28 is forced in inward radial direction 58A towards base 12, teeth 32 may engage exterior surface 12C of base 12. Teeth 32 may ensure that wedge member 28 does not "slip" along exterior surface 12C of base 12. That is, teeth 32 increase the coefficient of friction between wedge member 28 and exterior surface 12C, thereby increasing the friction force between the two surfaces. As each wedge member 28 on flange 16 contacts base 12 in this way, the net friction force between base 12 and flange 16 may be such that flange 16 becomes effectively fixed relative to base 12. As fasteners 30 are untightened, the friction force between each wedge member 28 and base 12 is reduced, until flange 16 is free to move relative to base 12. In this way, flange 16 is releasably fixable to base 12.

Figure 7:
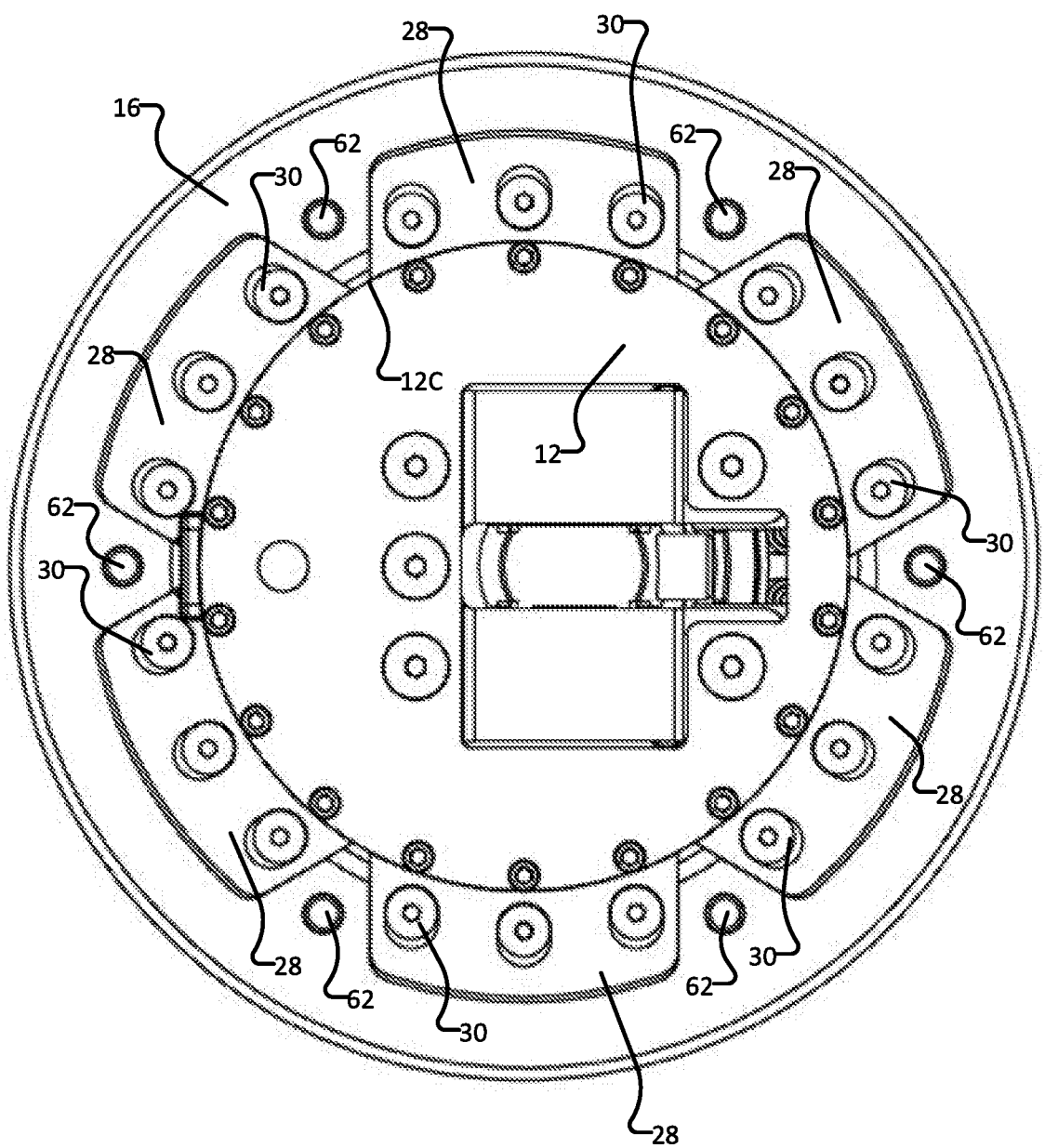
FIG. 7 is a bottom view of the suspension pedestal shown in FIGS. 1A and 1B.

FIG. 7 is a bottom view of suspension pedestal 10 which shows each of a plurality of wedge members 28 engaging base 12 in the manner described herein. In the embodiment of FIG. 7, each wedge member 28 is fixed to flange 16 with three fasteners 30. In other embodiments, each wedge member 28 may be fixed to flange 16 with more or fewer fasteners 30. In the embodiment of FIG. 7, flange 16 comprises six wedge members 28, and six bolts 62 to attach flange 16 to vehicle surface 9A. This corresponds with a common practice of providing six bolts 62 for suspension seat pedestals. However, in other embodiments, flange 16 may comprise more or fewer wedge members 28 and/or bolts 62. In some embodiments, a single wedge member 28 may provide sufficient force to fix flange 16 relative to base 12. However, increasing the number of wedge members 28 distributes this force around exterior surface 12C, and reduces the possibility of exterior surface 12C becoming deformed by a wedge member 28. When each of the one or more wedge members 28 are sufficiently biased towards base 12 in inward radial direction 58A, flange 16 is releasably fixed to base 12.

It is desirable for base 12 to be rigid enough to resist deformation as flange 16 is fixed to exterior surface 12C. However, if deformation of base 12 occurs, base rollers 20 and piston rollers 22 may compensate for the deformation, and the effect of such deformation on the movement of piston 14 within base 12 may be reduced.

Although not depicted, flange 16 may also be employed on non-suspension seat pedestals. Flange 16 could be substantially the same as described herein in such embodiments.

To facilitate relative longitudinal movement between base 12 and piston 14, suspension pedestal 10 optionally comprises a plurality of rollers, shown in FIG. 3. Base rollers 20 and piston rollers 22 may help to reduce friction and prevent relative radial or angular movement between base 12 and piston 14. That is, base rollers 20 may contact exterior surface 14C of piston 14, and piston rollers 22 may contact interior surface 12D of base 12. As piston 14 moves in longitudinal direction 15 relative to base 12, base rollers 20 and piston rollers 22 limit the friction resulting from this movement. Base rollers 20 and piston rollers 22 may be formed out of low-friction material, such as polyoxymethylene (e.g. as sold under the brand name Delrin™), polyether ether ketone (PEEK), stainless steel, carbon-fibre-reinforced polymer, glass-reinforced polymer, naval brass, or the like.

Base rollers may be, for example, fixed to a bracket attached to base 12, as shown in FIG. 3. Alternatively, base rollers 20 may be fixed to interior surface 12D of base 12. In the embodiment of FIG. 3, base rollers 20 are shown fixed close to distal end 12A of base 12, and far from proximal end 12B, to allow for maximum longitudinal movement of piston 14 and to prevent or minimize angular movement of piston 14 relative to base 12. However, this is not mandatory, and in other embodiments, base rollers 20 may be fixed closer to proximal end 12B. Base rollers 20 extend in inward radial direction 58A through cavity 13 from interior surface 12D of base 12 to exterior surface 14C of piston 14.

As shown in FIG. 3, piston rollers may be fixed to a bracket attached to piston 14. Alternatively, piston rollers 22 may be fixed to exterior surface 14C of piston 14. In the embodiment of FIG. 3, piston rollers 22 are shown fixed close to proximal end 14B of piston 14, and far from distal end 14A, to allow for maximum longitudinal movement of piston 14 and to prevent or minimize angular movement of piston 14 relative to base 12. However, this is not mandatory, and in other embodiments, piston rollers 22 may be fixed closer to distal end 14A. Piston rollers 22 extend in outward radial direction 58B through cavity 13 from exterior surface 14C of piston 14 to interior surface 12D of base 12.

Figure 9:
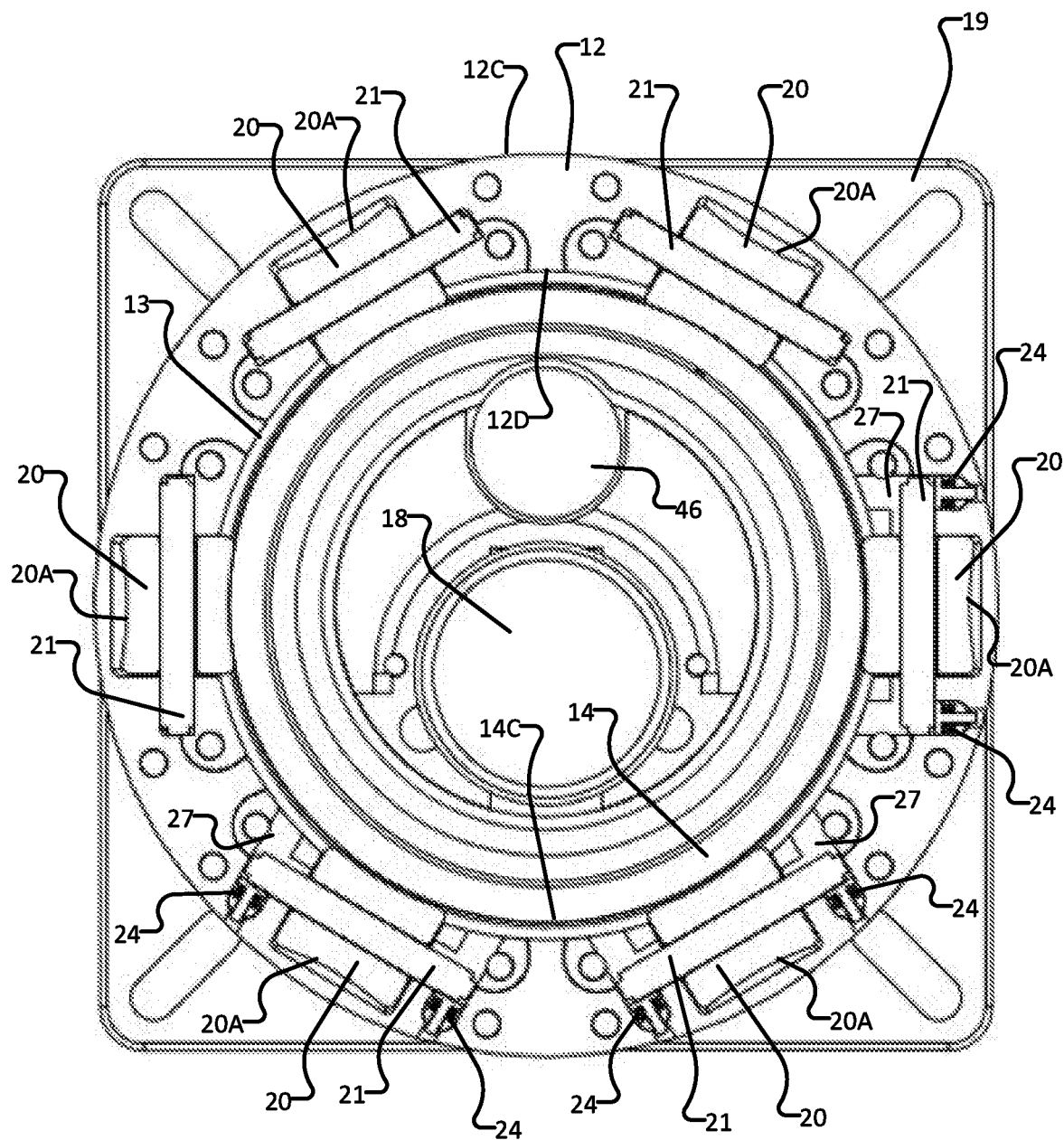
FIG. 9 is a bottom-up cross-sectional view of a plurality of base rollers in the suspension pedestal shown in FIGS. 1A and 1B.

FIG. 9 is a bottom-up cross-sectional view of suspension pedestal 10 showing base rollers 20. As shown in FIG. 9, base rollers 20 may be fixed to interior surface 12D of base 12 by axles 21. Axles 21 may be fixed to base 12 within channels 27, and base rollers 20 may rotate around axles 21. Axles 21 and base rollers 20 may be generally tangential to circumferential direction 56. Base rollers 20 may be spaced apart from one another in circumferential direction 56 around interior surface 12D of base 12.

The embodiment of FIG. 9 shows six base rollers 20 spaced apart around base 12. In other embodiments, more or fewer base rollers 20 may be spaced apart around base 12. However, as fewer base rollers 20 are spaced apart around base 12, each base roller 20 may experience a larger amount of force in radial direction 58 from piston 14. Therefore, a minimum of three base rollers 20 is desirable, to provide sufficient contact with exterior surface 14C of piston 14 and to locate piston 14 relative to base 12 as desired.

Base rollers 20 may each have a concave surface 20A, which may be complementary to the convex curvature of exterior surface 14C of piston 14.

Base rollers 20, and the corresponding sections of exterior surface 14C that are contacted by base rollers 20, may become worn over time as piston 14 moves relative to base 12. This would have the undesirable effect of causing a gap to form between base rollers 20 and piston 14, which may allow piston 14 to move in radial direction 58. To combat this effect, one or more of base rollers 20 may be biased in inward radial direction 58A by one or more biasing members 24. Biasing members 24 act on axles 21 to bias base rollers 20 towards piston 14 (i.e. in inward radial direction 58A), and thus assist base rollers 20 in remaining in constant contact with piston 14, even as base rollers 20 become worn over time. Biasing members 24 may comprise, for example, springs, solenoids, pneumatic actuators, elastomer members, or the like. In some embodiments, two biasing members 24 may be provided for each axle 21.

In some embodiments, one or more base rollers 20 are not biased in inward radial direction 58A towards piston 14. For example, FIG. 9 shows only three out of the six base rollers 20 having accompanying biasing members 24. In such embodiments, the base rollers 20 without biasing members 24 may have a fixed position in radial direction 58 relative to base 12. Base rollers 20 with biasing members 24 bias piston 14 towards unbiased base rollers 20, such that unbiased base rollers 20 may not require biasing members 24 to remain in constant contact with piston 14. As a base roller 20 without a biasing member 24 becomes worn over time, an opposing base roller 20 with a biasing member 24 may compensate for any gap that forms relative to piston 14. In other embodiments, all base rollers 20 are biased in inward radial direction 58A towards piston 14. By reducing the number of biased base rollers 20, relative radial movement between base 12 and piston 14 may be reduced.

Figure 10:
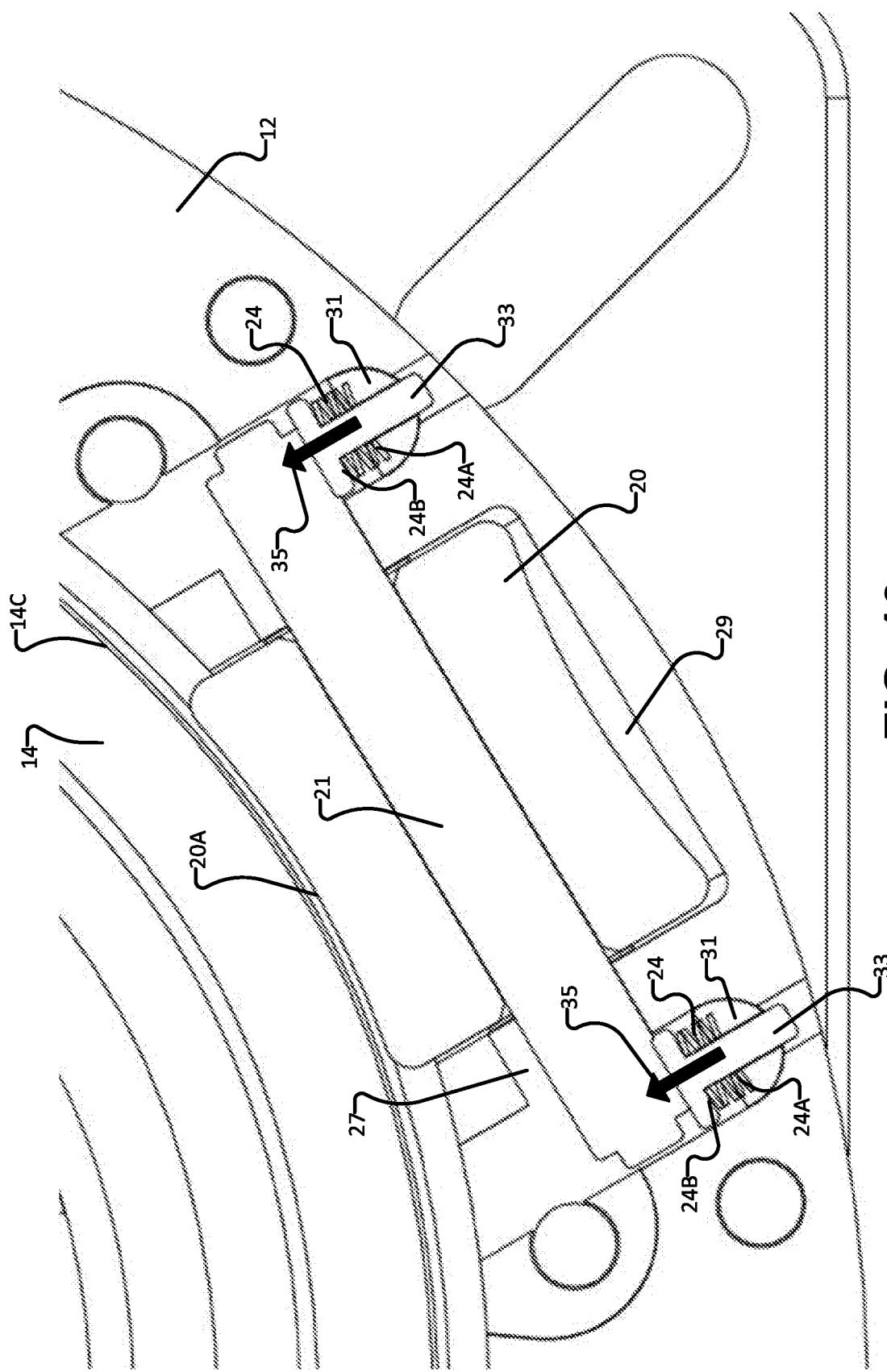
FIG. 10 is a detail view of one of the base rollers shown in FIG. 9.

FIG. 10 is a detail view of the interaction between axle 21 and biasing members 24. As shown in FIG. 10, axle 21 is movable within a channel 27. Channel 27 is larger in radial direction 58 than the radial diameter of axle 21, allowing axle 21 to move in radial direction 58 within channel 27. Similarly, base roller 20 is movable within a channel 29, which is larger in radial direction 58 than the radial diameter of base roller 20, allowing base roller 20 to move in radial direction 58 within channel 29. Finally, biasing member 24 is movable within a channel 31. A stationary end 24A of biasing member 24 is fixed to or abuts base 12, while a free end 24B is free to move within channel 31. A plunger 33 is fixed to free end 24B of biasing member 24. Plunger 33 is forced into contact with axle 21 as biasing member 24 extends in channel 31. Plunger 33 thereby provides a force 35 in inward radial direction 58A to axle 21. This causes axle 21 to move within channel 27 towards piston 14, which in turn causes base roller 20 to move within channel 29 towards piston 14. In this way, concave surface 20A of base roller 20 is caused to constantly contact with exterior surface 14C of piston 14. In some embodiments, biasing members 24 apply forces directly to axle 21, without a plunger 33.

Figure 11:
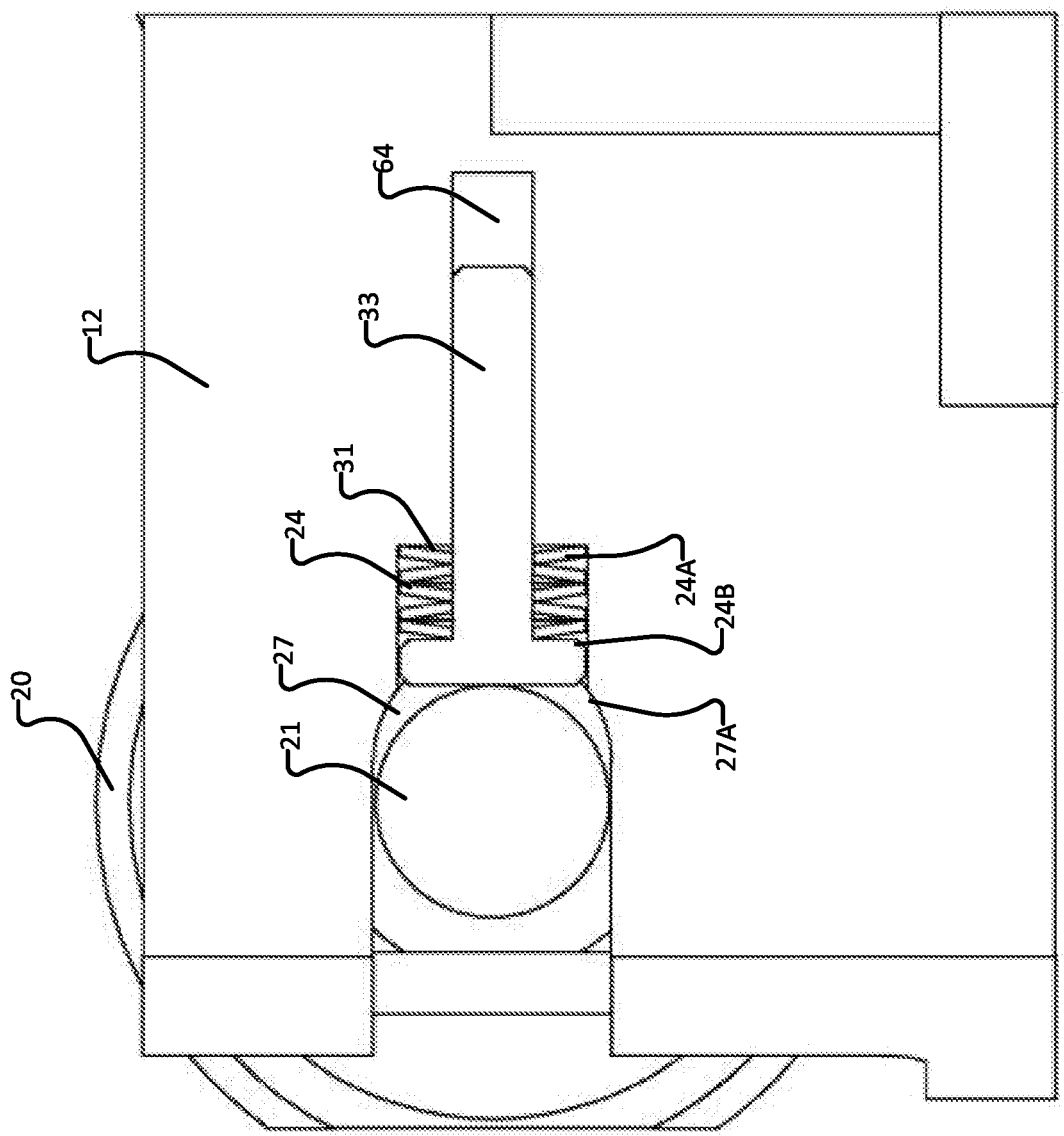
FIG. 11 is a cross-sectional side view of one of the base rollers shown in FIG. 9.

FIG. 11 is a cross-sectional side view of the interaction between axle 21 and biasing member 24. As shown in FIG. 11, plunger 33 moves within a channel 64 which extends in radial direction 58 as biasing member 24 expands and contracts. Channel 64 may be an extension of channel 31 with a smaller diameter. As seen in FIG. 11, channel 27 may have a rounded end 27A, which may be complementary to axle 21 for receiving axle 21 when biasing member 24 is fully-compressed.

Figure 12:
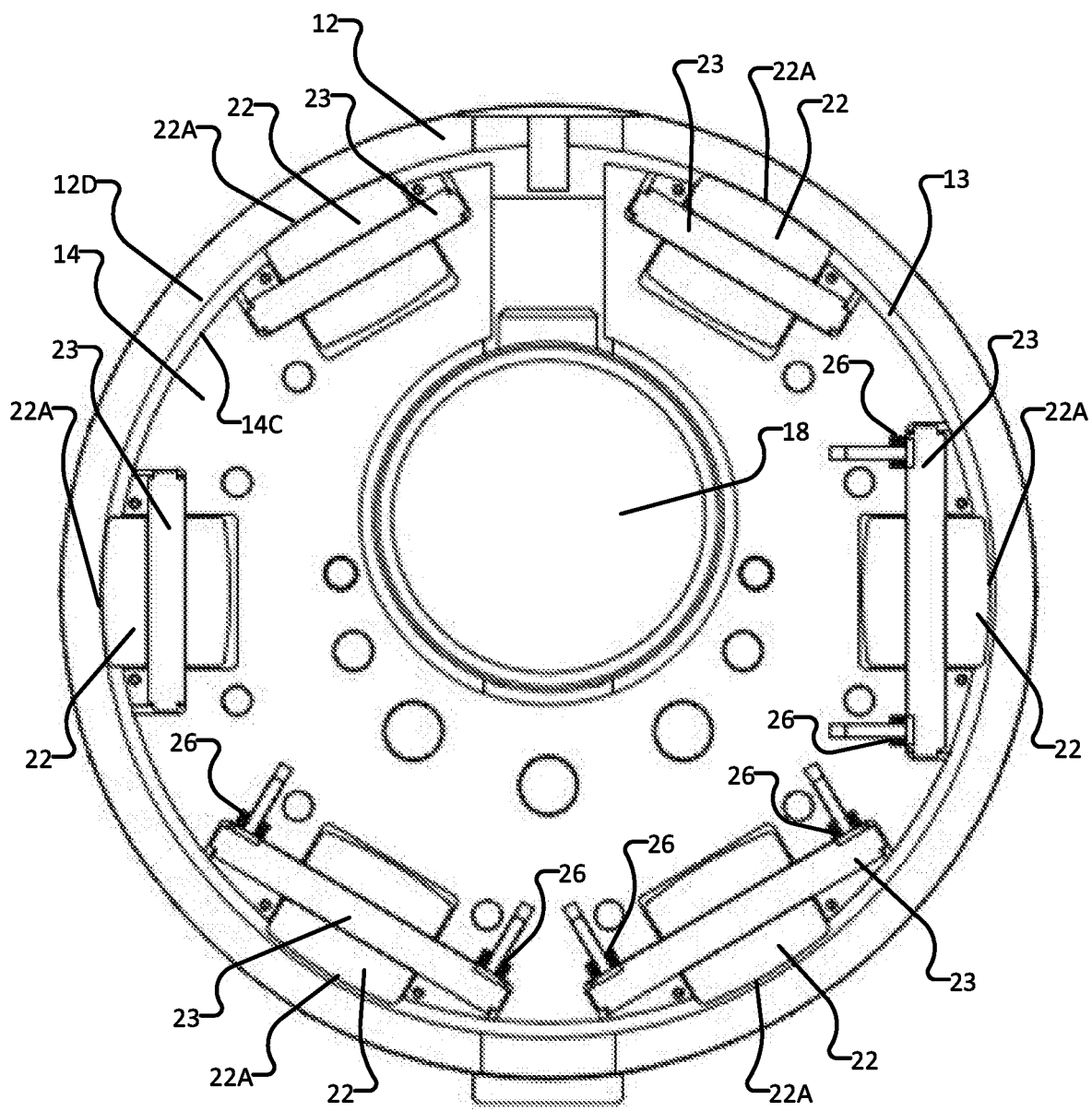
FIG. 12 is a top-down cross-sectional view of a plurality of piston rollers in the suspension pedestal shown in FIGS. 1A and 1B.

FIG. 12 is a top-down cross-sectional view of suspension pedestal 10 showing piston rollers 22. Piston rollers 22 may function in substantially the same way as base rollers 20 as described herein. That is, axles 23 may function in the same way as axles 21. Channels 27 and 37, 29 and 39, 31 and 41, and 62 and 64 may have similar construction and function. Plungers 33 and 43 may have similar construction and function. Force 45 differs from force 35 in that force 45 is in outward radial direction 58B as compared to force 35 which is in inward radial direction 58A Piston rollers 22 may each have a convex surface 22A, which may be complementary to the concave curvature of interior surface 12D of base 12.

Figure 13:
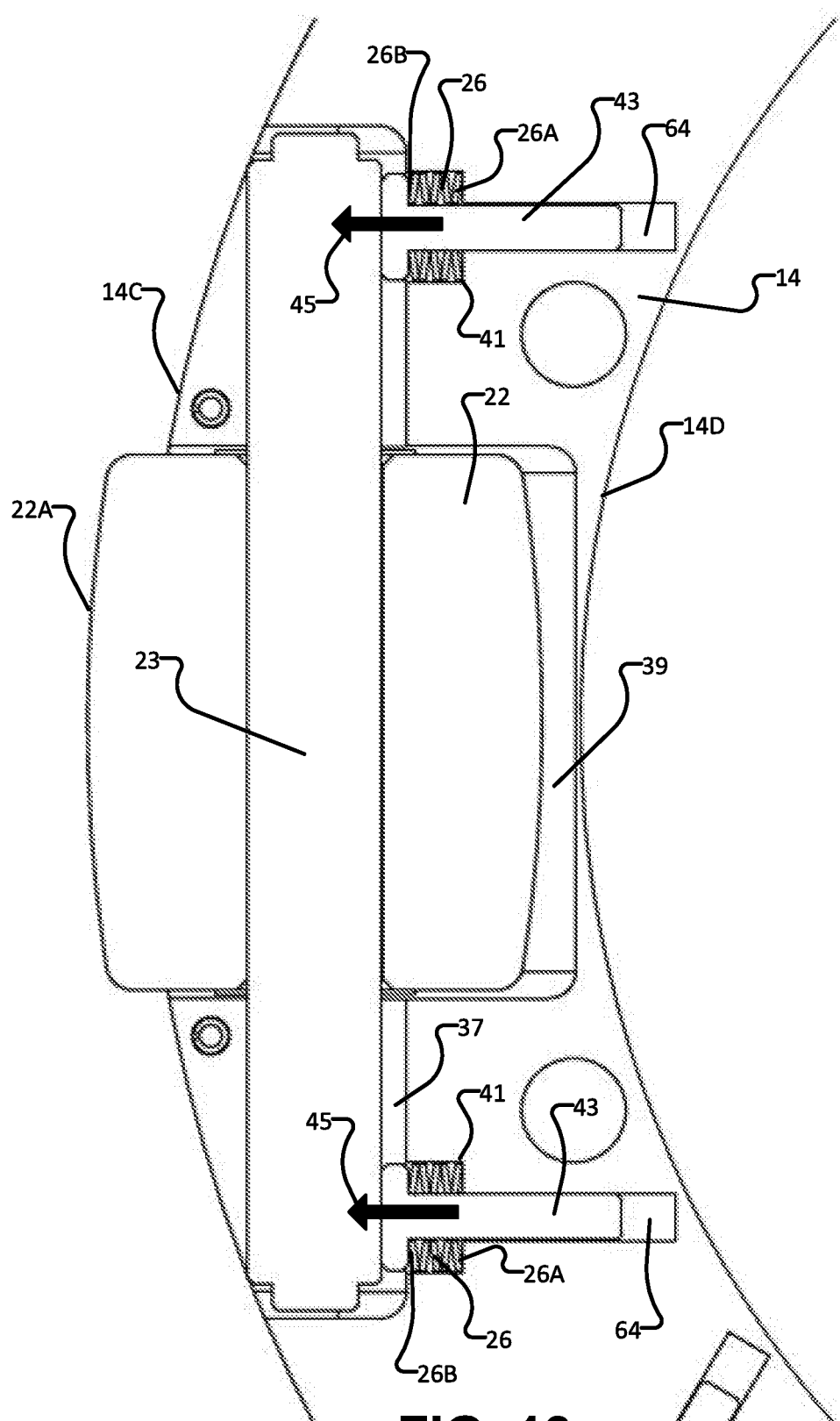
FIG. 13 is a detail view of one of the piston rollers shown in FIG. 12.

FIG. 13 is a detail view of the interaction between axle 23 and biasing members 26. This interaction may be substantially similar to the interaction between axle 21 and biasing member 24 as described herein.

Referring again to FIG. 2, suspension pedestal 10 may comprise guide wall 36 and guide wheel 38. Guide wall 36 may be substantially similar to guide wall 50, except that guide wall 38 is formed on base 12 instead of piston 14. Guide wheel 38 may be substantially similar to guide wheel 48, and may rotate around an axle 40 which is substantially similar to axle 52. A bearing or bushing 40 may be provided between guide wheel 38 and axle 40.

Figure 14:
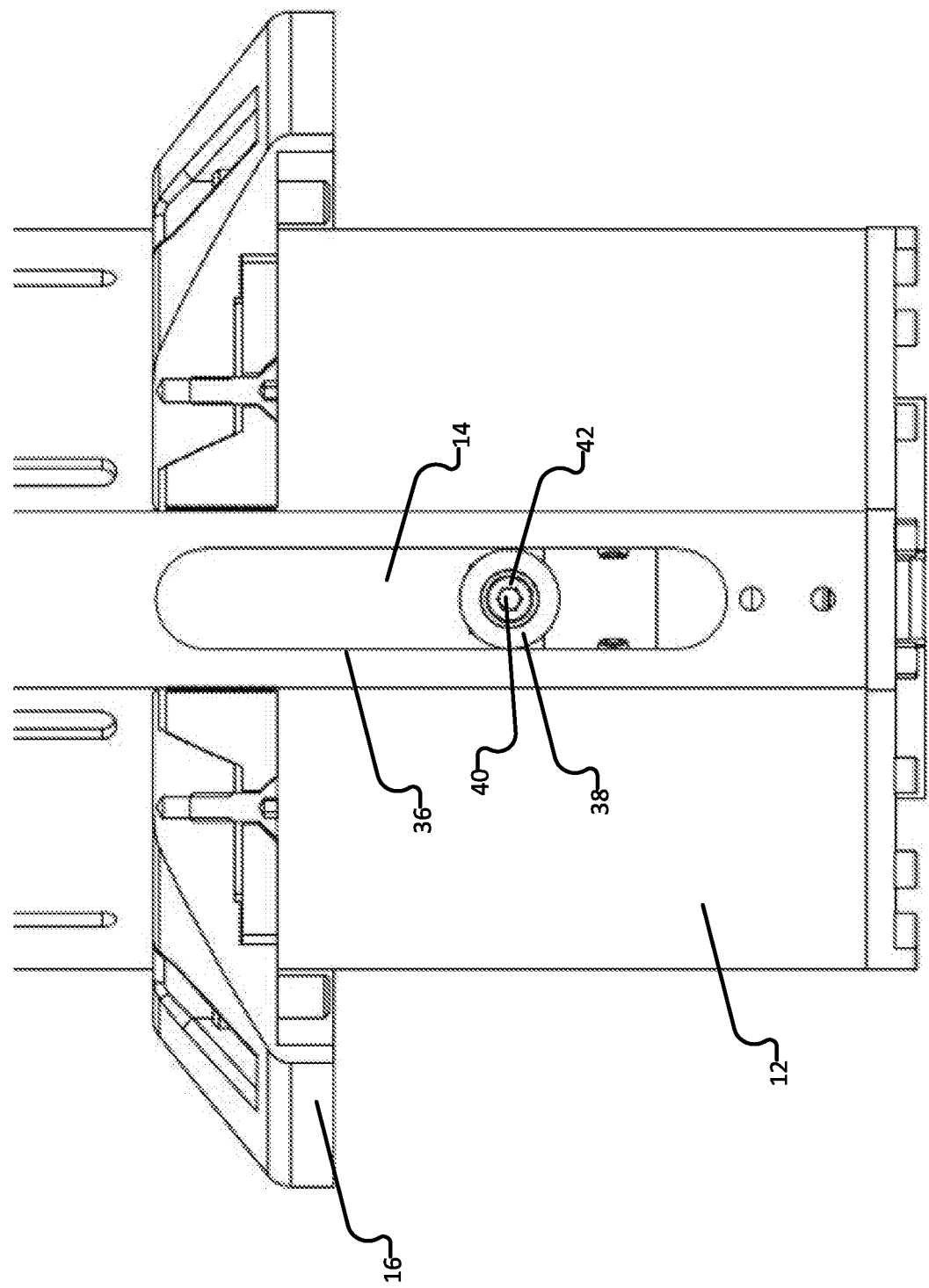
FIG. 14 is an external side view of a portion of the suspension pedestal shown in FIGS. 1A and 1B, showing a piston guide wheel and guide wall.

FIG. 14 is a front view of guide wall 36 and guide wheel 38. As can be seen in FIG. 14, movement in circumferential direction 56 (i.e. to the left or right in FIG. 14) of guide wheel 38 is constrained by guide wall 36, which in this embodiment forms a slot through base 12. In this way, piston 14 may be rotationally fixed relative to base 12.

Figure 15:
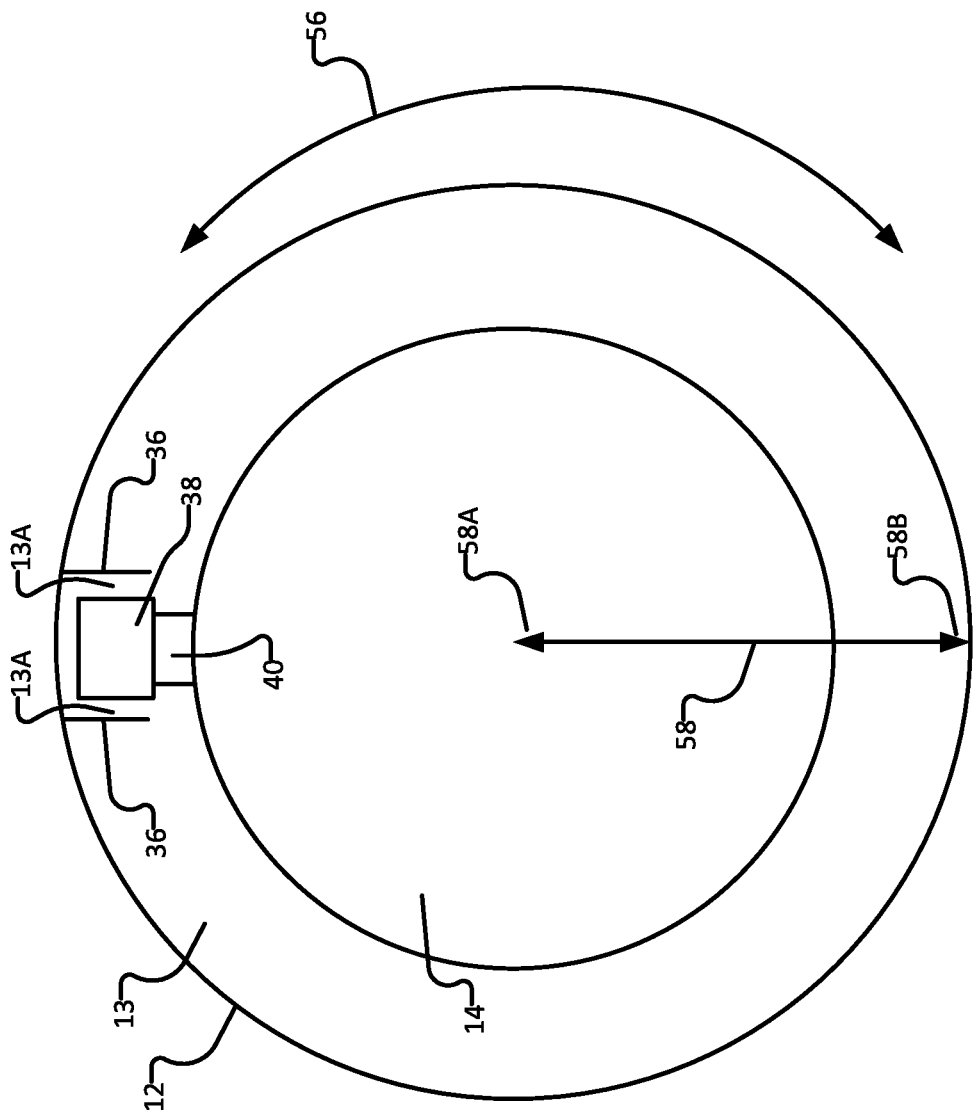
FIG. 15 is a schematic top-down view of the guide wheel and guide wall shown in FIG. 14.

FIG. 15 is a schematic view of the interaction between guide wall 36 and guide wheel 38. For simplicity, most other components have been removed from FIG. 15. As seen in FIG. 15, a space 13A may be present between guide wheel 38 and guide wall 36, on one or both sides of guide wheel 38. This allows guide wheel 38 to roll along one side of guide wall 36 without contacting the other side of guide wall 36.

Rolling motion between guide wheel 38 and guide wall 36 may cause less friction and less wear on guide wheel 38, compared to the sliding movement which would occur if guide wheel 38 were instead a non-rotating block, for example. In this way, guide wheel 38 provides a long-lasting means for constraining rotational movement of piston 14 relative to base 12.

Suspension pedestal 10 may comprise a mechanism for adjusting the height of a seat. In the illustrated embodiment a height adjustment mechanism is provided that includes a height-adjust shaft 44 which is at least partially receivable within cavity 17 of piston 14. Height adjust shaft 44 may be moved relative to piston 14 to raise or lower a seat supported by suspension pedestal 10. An actuator such as a pneumatic cylinder 46 may be provided to set height adjust shaft 44 at a position corresponding to a desired seat height.

Height-adjust shaft 44 may protrude through an opening in distal end 14A. Height-adjust shaft 44 comprises distal end 44A and proximal end 44B. One or both of distal end 44A and proximal end 44B may comprise openings. Height-adjust shaft 44 may have a cylindrical shape. Height-adjust shaft 44 may be substantially hollow, such that a cavity 45 is defined within height-adjust shaft 44. Height-adjust shaft 44 extends in longitudinal direction 15, and may be co-axial with piston 14. Height-adjust shaft 44 may be movable in longitudinal direction 15 relative to piston 14. A bushing may limit friction between height-adjust shaft 44 and interior surface 14D of piston 14. Height-adjust shaft 44 may be composed of any suitable material or materials such as metal, polymer, composite, or a combination thereof. Inner and/or outer surfaces of height-adjust shaft 44 may be coated with a long-wearing material.

Figure 5:
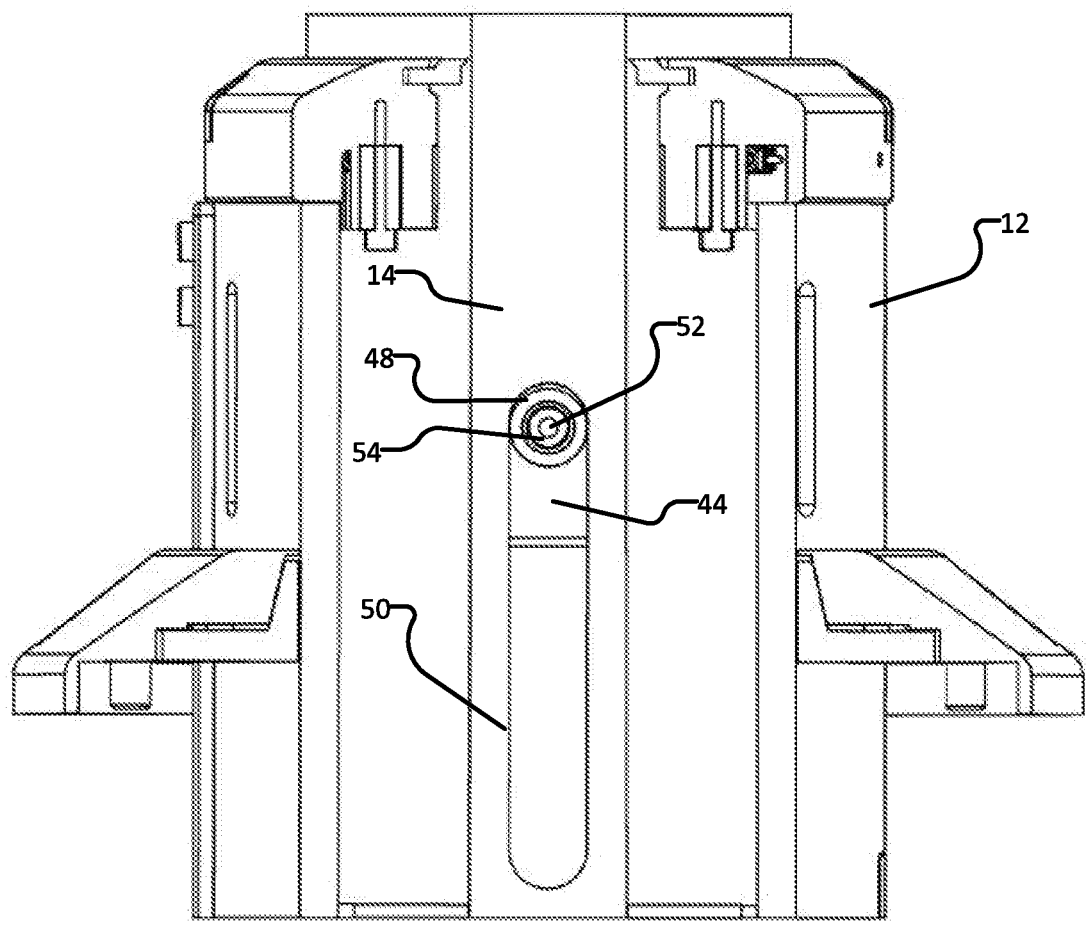
FIG. 5 is a cutaway side view of a portion of the suspension pedestal shown in FIGS. 1A and 1B, showing a height-adjust shaft guide wheel and guide wall.

Height-adjust shaft 44 may be rotationally fixed relative to piston 14. FIG. 5 shows a guide wheel 48 limited in its movement in circumferential direction 56 (i.e. to the left or right in FIG. 5) by a guide wall 50 on piston 14. In this embodiment, guide wall 50 forms a slot through piston 14. Guide wheel 48 is connected to height-adjust shaft 44 by an axle 52. Guide wheel 48 may rotate around axle 52. Optionally, a bearing or bushing 54 may be provided between guide wheel 48 and axle 52. As height-adjust shaft 44 moves relative to piston 14, its rotational movement is constrained by the interaction between guide wheel 48 and guide wall 50.

A space may be present between guide wheel 48 and guide wall 50, on one or both sides of guide wheel 48. This allows guide wheel 48 to roll along one side of guide wall 50 without contacting the other side of guide wall 50. Rolling motion between guide wheel 48 and guide wall 50 may reduce friction and thereby reduce wear on guide wheel 48, compared to the sliding movement which would occur if guide wheel 48 were instead a non-rotating block, for example. In this way, guide wheel 48 provides a long-lasting means for constraining rotational movement of height-adjust shaft 44 relative to piston 14.

As described herein, a bushing may be provided between piston 14 and height-adjust shaft 44 to limit friction between the two. The disadvantages of traditional bushings discussed above may not be as prominent in this configuration, since height-adjust shaft 44 moves relatively infrequently compared to piston 14. However, the bushing between piston 14 and height-adjust shaft 44 may optionally be replaced by rollers, similar to base rollers 20 and piston rollers 22 as described herein, between piston 14 and height-adjust shaft 44, to provide a longer-lasting means of reducing friction between the two shafts.

Referring again to FIG. 2, suspension pedestal 10 may comprise a pneumatic cylinder 46. Pneumatic cylinder 46 may fix height-adjust shaft 44 at a certain longitudinal position relative to piston 14. Pneumatic cylinder 46 is movable between a compressed position, where height-adjust shaft 44 is substantially or entirely contained within piston 14 (i.e. distal end 44A is level, or close to level (e.g. within two centimetres), with distal end 14A), and an extended position, where distal end 44A of height-adjust shaft 44 is raised above (i.e. in positive longitudinal direction 15A) piston 14. FIG. 2 shows pneumatic cylinder 46 in the extended position. Once pneumatic cylinder 46 sets the position of height-adjust shaft 44, height-adjust shaft 44 remains fixed relative to piston 14 until pneumatic cylinder 46 is released and height-adjust shaft 44 is allowed to move in longitudinal direction 15 relative to piston 14.

Pneumatic cylinder 46 comprises distal end 46A and proximal end 46B. Distal end 46A is fixed to height-adjust shaft 44, and proximal end 46B is fixed to piston 14. Pneumatic cylinder 46 extends in longitudinal direction 15 through cavity 17, through proximal end 44B, and into cavity 45. Pneumatic cylinder 46 may or may not be co-axial with base 12, piston 14, or height-adjust shaft 44. Pneumatic cylinder 46 may comprise, for example, a single-acting cylinder, a double-acting cylinder, a telescoping cylinder, a rodless cylinder, a gas lift cylinder, or the like.

Figure 8:
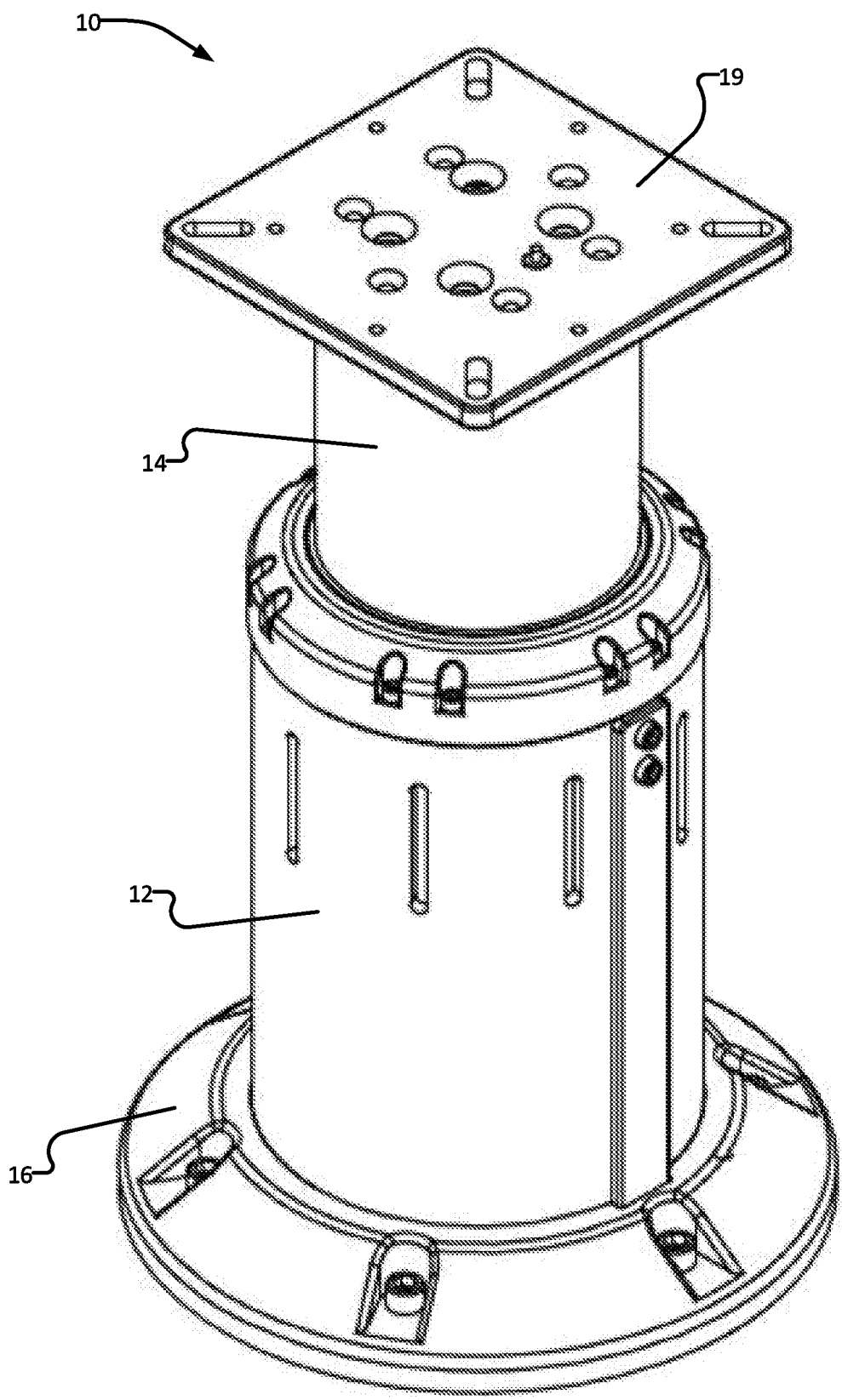
FIG. 8 is a perspective view of the suspension pedestal shown in FIGS. 1A and 1B with a pneumatic cylinder in a compressed position.

As can be seen in FIG. 8, when pneumatic cylinder 46 is in the compressed position, height-adjust shaft 44 is substantially or entirely contained within piston 14, such that it does not add to the height of suspension pedestal 10 in longitudinal direction 15 defined by base 12 and piston 14. Thus, the height adjust mechanism of suspension pedestal 10 does not substantially increase the minimum height of suspension pedestal 10.

Suspension pedestal 10 comprises a support 19, which may be fixed to distal end 44A of height-adjust shaft 44. In embodiments where height-adjust shaft 44 is not present in suspension pedestal 10, support 19 may be fixed to distal end 14A of piston 14. As shown in FIG. 1B, support 19 may support a seat, for example a boat seat, car seat, or tractor seat. The height of support 19 above (i.e. in positive longitudinal direction 15A) vehicle surface 9A, such as a boat deck, is defined by the point at which flange 16 is fixed to exterior surface 12C of base 12 (and thus the height of base 12 relative to vehicle surface 9A), the state of compression of isolator 18 (and thus the height of piston 14 relative to base 12), and the state of extension of pneumatic cylinder 46 or other actuator (and thus the height of height-adjust shaft 44 relative to piston 14).

The example embodiments described herein have several distinct advantages over the prior art, including (without limitation):

base rollers 20 and piston rollers 22 may provide a long-lasting means of reducing friction between base 12 and piston 14, compared to traditional bushings;

guide wheel 38 and guide wall 36 may provide a long-lasting means of limiting rotational movement of piston 14 relative to base 12, compared to traditional non-rotating blocks;

guide wheel 48 and guide wall 50 may provide a long-lasting means of limiting rotational movement of height-adjust shaft 44 relative to piston 14, compared to traditional non-rotating blocks;

flange 16 being releasably fixable to base 12 at any point between distal end 12A and proximal end 12B allows the height of base 12 above vehicle surface 9A to be varied, and provides a wider height range for suspension pedestal 10 than is available on other suspension seats; and a suspension pedestal 10 may be retrofitted onto many structures fit for receiving a traditional suspension seat pedestal.

A method for using a suspension pedestal as described herein comprises:

adjusting flange 16 to a desired position along base 12;

fixing flange 16 at the desired longitudinal position;

attaching suspension pedestal 10 to a surface 9A of a vehicle 9; and attaching a seat to suspension pedestal 10 (if a seat is not already attached).

INTERPRETATION OF TERMS

Unless the context clearly requires otherwise, throughout the description and the claims:
  "comprise", "comprising", and the like are to be construed in an inclusive sense, as opposed to an exclusive or exhaustive sense; that is to say, in the sense of "including, but not limited to";
  "connected", "coupled", or any variant thereof, means any connection or coupling, either direct or indirect, between two or more elements; the coupling or connection between the elements can be physical, logical, or a combination thereof;
  "herein", "above", "below", and words of similar import, when used to describe this specification, shall refer to this specification as a whole, and not to any particular portions of this specification;
  "or", in reference to a list of two or more items, covers all of the following interpretations of the word: any of the items in the list, all of the items in the list, and any combination of the items in the list;
  the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Where a component (e.g. an isolator, actuator, assembly, fastener, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described herein. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

As will be apparent to those skilled in the art in light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A suspension system comprising:
  a hollow base having longitudinally-opposed distal and proximal base ends;
  a piston having longitudinally-opposed distal and proximal piston ends, the proximal piston end being at least partially received within the base and movable relative to the base in a longitudinal direction;
  a support fixed to the distal piston end;
  an isolator having a distal isolator end and a proximal isolator end, the distal isolator end fixed to the piston and the proximal isolator end fixed to the base; and
  a flange for fixing the suspension system to a surface, the flange extending in a circumferential direction around an exterior surface of the base and extending in an outward radial direction from the base, the flange releasably fixable to any of plural locations spaced apart longitudinally along the exterior surface of the base to selectively adjust a maximum spacing between the flange and the support.

2. A suspension system according to claim 1 wherein the base comprises a plurality of base rollers fixed to an interior surface of the base to roll against an exterior surface of the piston as the piston moves in the longitudinal direction relative to the base.

3. A suspension system according to claim 2 wherein one or more of the plurality of base rollers is biased in an inward radial direction toward the exterior surface of the piston.

4. A suspension system according to claim 2 wherein each of the plurality of base rollers comprises a base roller wheel rotatable around a base roller axle, each base roller axle tangential to the interior surface of the base.

5. A suspension system according to claim 2 wherein the piston comprises a plurality of piston rollers fixed to the exterior surface of the piston to roll against the interior surface of the base as the piston moves in the longitudinal direction relative to the base.

6. A suspension system according to claim 5 wherein one or more of the plurality of piston rollers is biased in the outward radial direction toward the interior surface of the base.

7. A suspension system according to claim 5 wherein each of the plurality of piston rollers comprises a piston roller wheel rotatable around a piston roller axle, each piston roller axle tangential to the exterior surface of the piston.

8. A suspension system according to claim 4 wherein a spacing between at least one of the base roller axles and the interior surface of the base is fixed.

9. A suspension system according to claim 1 wherein the flange comprises a wedge member abuttable against the exterior surface of the base to releasably fix the flange to one of the plural locations spaced apart longitudinally along the exterior surface of the base.

10. A suspension system according to claim 9 wherein the wedge member is fixed to the flange by one or more fasteners, each of the one or more fasteners comprising a beveled surface that abuts a beveled surface of the wedge member to increasingly force the wedge member in the inward radial direction against the exterior surface of the base as each of the one or more fasteners is tightened.

11. A suspension system according to claim 9 wherein the wedge member is fixed to the flange by one or more fasteners, each of the one or more fasteners abutting a beveled intermediate piece that abuts a beveled surface of the wedge member to increasingly force the wedge member in the inward radial direction against the exterior surface of the base as each of the one or more fasteners is tightened.

12. A suspension system according to claim 1 wherein the base comprises first and second guide walls extending in the longitudinal direction and the piston comprises a wheel, the wheel free to move in the longitudinal direction and limited in movement in a circumferential direction by the first and second guide walls to thereby limit rotation of the piston relative to the base.

13. A suspension system according to claim 1 wherein the piston comprises first and second guide walls extending in the longitudinal direction and the base comprises a wheel, the wheel free to move in the longitudinal direction and limited in movement in a circumferential direction by the first and second guide walls to thereby limit rotation of the piston relative to the base.

14. A suspension system according to claim 1 comprising a height-adjust shaft having longitudinally-opposed distal and proximal height-adjust shaft ends, the height-adjust shaft being at least partially received within the piston, wherein the height-adjust shaft is selectively movable in the longitudinal direction relative to the piston such that the proximal height-adjust shaft end is fixable at any position between the distal and proximal ends of the piston.

15. A suspension system according to claim 14 wherein the height-adjust shaft is selectively movable in the longitudinal direction relative to the piston such that an entirety of the height-adjust shaft may be contained within the piston.

16. A suspension system according to claim 1 wherein the support comprises a seat fixed to the distal piston end.

17. A suspension system according to claim 1 wherein the surface is a vehicle deck.

18. A suspension system according to claim 17 wherein the base extends through the vehicle deck.

19. A suspension system comprising:
a hollow base;
a piston telescopically received in the base for longitudinal motion relative to the base, the piston being biased to extend from the base;
an isolator connected between the piston and the base to mitigate relative longitudinal movement between the base and the piston; and
a mounting flange movable longitudinally along the base and selectively fixable to the base at any of plural locations spaced longitudinally along the base.

* * * * *